US007499633B2

(12) United States Patent
Liang

(10) Patent No.: US 7,499,633 B2
(45) Date of Patent: Mar. 3, 2009

(54) INFRARED HEATER

(76) Inventor: Hsin-Lien Liang, No. 80, Tzu Chung 2nd Street, ChungLi City, TaoYuan County 320 (TW)

( * ) Notice: Subject to any disclaimer, the term of this patent is extended or adjusted under 35 U.S.C. 154(b) by 345 days.

(21) Appl. No.: 11/489,499

(22) Filed: Jul. 20, 2006

(65) Prior Publication Data

US 2008/0031603 A1 Feb. 7, 2008

(51) Int. Cl.
*F21V 7/00* (2006.01)
*G21G 4/00* (2006.01)
*A21B 1/00* (2006.01)

(52) U.S. Cl. .................... 392/422; 219/405; 250/493.1

(58) Field of Classification Search ................ 392/422, 392/423, 424, 425, 426, 427, 428, 429, 430, 392/431; 219/405; 250/493.1
See application file for complete search history.

(56) References Cited

U.S. PATENT DOCUMENTS 4,596,935 A * 6/1986 Lumpp .................... 250/495.1
4,914,718 A * 4/1990 Geilinger et al. ............ 219/213
6,108,491 A * 8/2000 Anderson .................. 392/418
6,172,647 B1 * 1/2001 Jones ......................... 343/704
6,426,486 B1 * 7/2002 Bartok ....................... 219/405
6,825,615 B2 * 11/2004 Shigeoka .................... 313/635

* cited by examiner

*Primary Examiner*—Daniel L Robinson
(74) *Attorney, Agent, or Firm*—Rosenberg, Klein & Lee

(57) ABSTRACT

An infrared heater includes a support body and a heat source irradiating device. The heat source irradiating device includes a reflecting hood, a hood body, two non-planar symmetric arc bodies disposed on the top surface of an n-shape body, a casing, and an infrared tube, such that a radiant heat at the upper half of the infrared tube can be radiated from an open end having an included angle from 60° to 80° from the hood body after the radiant heat is reflected from the two arc bodies. Its radiant heat can avoid the infrared tube during its reflection to improve the heat reflecting efficiency, extend the life expectancy of the infrared tube, and enhance the irradiating range of the heater and the evenness of heat energy.

6 Claims, 8 Drawing Sheets
(1 of 8 Drawing Sheet(s) Filed in Color)

INFRARED HEATER

BACKGROUND OF THE INVENTION

1. Field of the Invention

The invention relates to an infrared heater, and more particularly to a reflecting hood specially designed for an irradiating unit to improve the heat reflecting efficiency by avoiding radiant heat from being reflected to its infrared tube, so as to extend the life expectancy of the infrared tube and enhance the irradiating range of the heater and the evenness of heat energy.

2. Description of the Related Art

Electric heater is a type of electric appliance, which converts the electrical energy to thermal energy. In order to increase the thermal efficiency of electric heater, the lamp tube as a source of heating radiation has been evolved to the high-powered infrared tube. However, though the thermal energy of electric heater and the light energy of illuminating appliance, both have lamp tube respectively, the function and the requirement differ completely. For example, part of the emitting light of the illuminating appliance is radiated by the tube directly, and most of the other part will concentrate in certain angle after reflection by the reflecting cap to achieve the required focusing brightness.

However, in addition to the required relative high power, the lamp tube as a source of heating radiation of electric heater demands the thermal energy on effective range of proliferation, so that the distribution of thermal energy would be better.

Conversely, if the method which is employed in the illuminating appliance and through which the heat is concentrated in a particular narrow area is taken, not only will the purpose of warming of surrounding space fail to achieve, but also the thermal energy focusing is easy to be formed in the illuminated area due to the concentration of thermal energy like the light beam, thereby making the exposed person uncomfortable.

Secondly, the French scientist Fermat proposed the principle that should be applied on the light transmission way. It is the well-known Fermat theorem. In other words, the light transmission process must comply with the principle of least time. Thus, this principle, which the light should comply with after reflection, is known as the law of reflection. We illustrate law of reflection with FIG. 1. When the light emits from n medium to n' medium, some light returns at interface surface $\overline{MN'}$ back to n medium. This phenomenon is known as reflection. The plane that is comprised of S, B, and P is called as incident plane. SB light ray is called as incident light. Meanwhile, BP-light ray is reflective light and $\overline{MN'}$ light ray is known as normal line. The angle between the incident light and normal line is called as incident angle θi. The angle between reflective light and normal line is called as reflection angel θr. The law of reflection can be summarized into the following three points:

(1) The incident light, reflective light and the normal line are on incident plane together (2) The incident light, reflective light are on both sides of the normal line (3) The incident angle is equal to the reflection angel, θi=θr.

In addition, as shown in the FIG. 2 and FIG. 3, the reflection caps of the current electric heater are shown in the two figures. In accordance with the above described Fermat theorem, no matter whether the arc-shaped reflection cap (11) or the ⌐¬-shaped reflection cap (12) are applied, it can be concluded that the upward radiation heat from the upper half of center (S) of the heating source of the infrared lights tubes (10) creates incident light $\overrightarrow{SB}$ and reflective lights $\overrightarrow{BP}$, $\overrightarrow{BB'P}$ after the reflection by the reflection cap. The reflective light (heat) concentrates in the middle area, as shown in FIG. 8. Furthermore, the incident light (SA) upon the center (S) of the heating source focuses on the light tube (10) after reflection. Besides, the waste of heating source, the reflected heat in this area has extremely high temperature, which leads to an adverse influence to the life span of the infrared lights tubes (10). Moreover, most of the reflection caps of current electric heaters are made by bending a metal plate. When the heating effect of incident light $\overrightarrow{SA}$ and reflective light $\overrightarrow{AS}$ continues, the accumulated heat cannot be released efficiently. After a long-termed use, light reflection caps (11) or (12) are easily deformed, or even bent. Therefore, the application is not yet very ideal.

SUMMARY OF THE INVENTION

Therefore, it is a primary object of the present invention to provide an infrared heater that includes a reflecting hood of a heat source irradiating device capable of improving the heat reflecting efficiency by avoiding the radiant heat from being reflected to the infrared tube, so as to extend the life expectancy of the infrared tube and enhance the irradiating range of the heater and the evenness of heat energy.

Another object of the present invention is to provide an infrared heater whose reflecting hood is integrally formed by aluminum extrusion, such that the reflecting hood has a better mechanical strength and its heat dissipating fins disposed around the reflecting hood can dissipate heat from the reflecting hood to the outside, so as to assure the life of the heater.

In order to achieve the above-mentioned objects, a heat source irradiating device including:

i) a reflecting hood integrally formed by aluminum extrusion, and having a hood body with symmetric arcs on both sides, an n-shape body formed at the top of the hood body, and two non-planar symmetric arc bodies with a center line AA' of the reflecting hood as a base and disposed on the top surface of the n-shape body, such that the n-shape body shows a double-arc wavy surface, and the each arc body separately defines each center N1, N2;

ii) a casing for installing and fixing the reflecting hood therein; and iii) an infrared tube installed along a center line AA' of the reflecting hood, and disposed at a height between the n-shape body and the hood body, such that the center S of the infrared tube is situated between two centers N1, N2 of the two symmetrical arc bodies, and a radiant heat is radiated from an open end having an included angle from 60° to 80° with the hood body after the radiant heat at the upper half of the infrared tube is reflected from the two arc bodies.

BRIEF DESCRIPTION OF THE FIGURES

The file of this patent contains at least one drawing executed in color. Copies of this patent with color drawings will be provided by the Patent and Trademark Office upon request and payment of the necessary fee.

DETAILED DESCRIPTION OF THE PREFERRED EMBODIMENT

Figure 1:
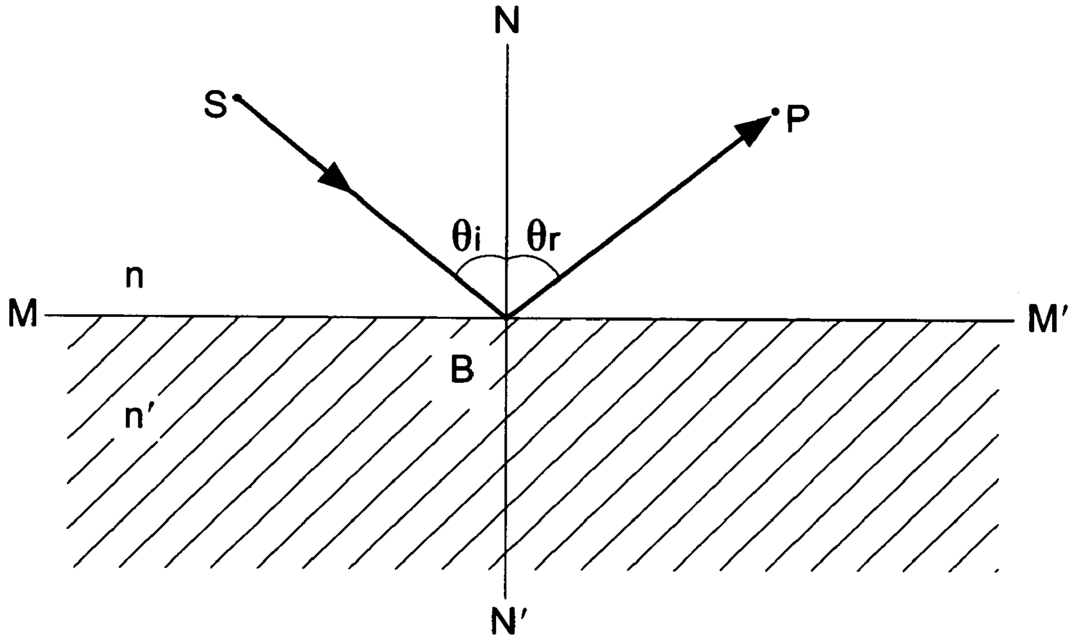
FIG.1 PRIOR ART
FIG. 1 is a schematic view of a traditional law of reflection.
Figure 2:
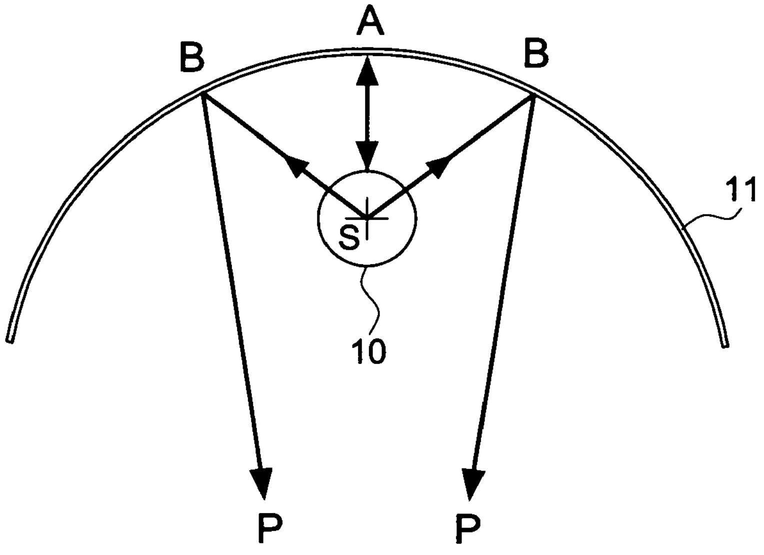
FIG.2 PRIOR ART
FIG. 2 is a schematic view of a prior art reflecting hood.
Figure 3:
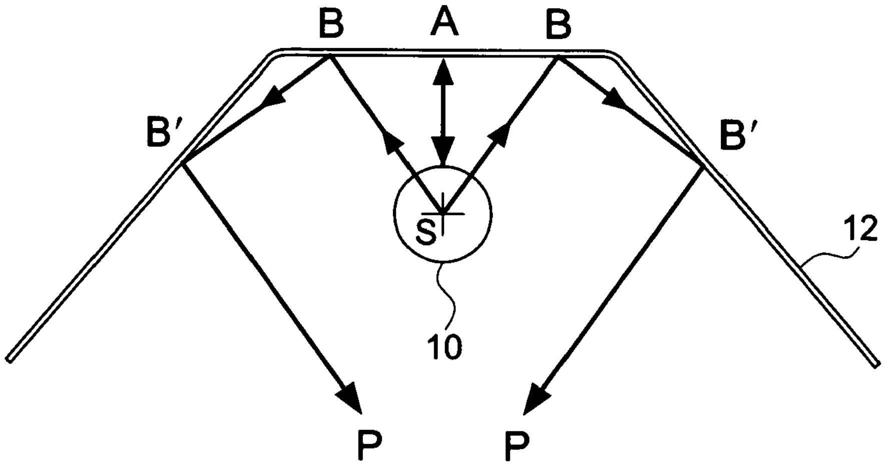
FIG.3 PRIOR ART
FIG. 3 is a schematic view of another prior art reflecting hood.
Figure 4:
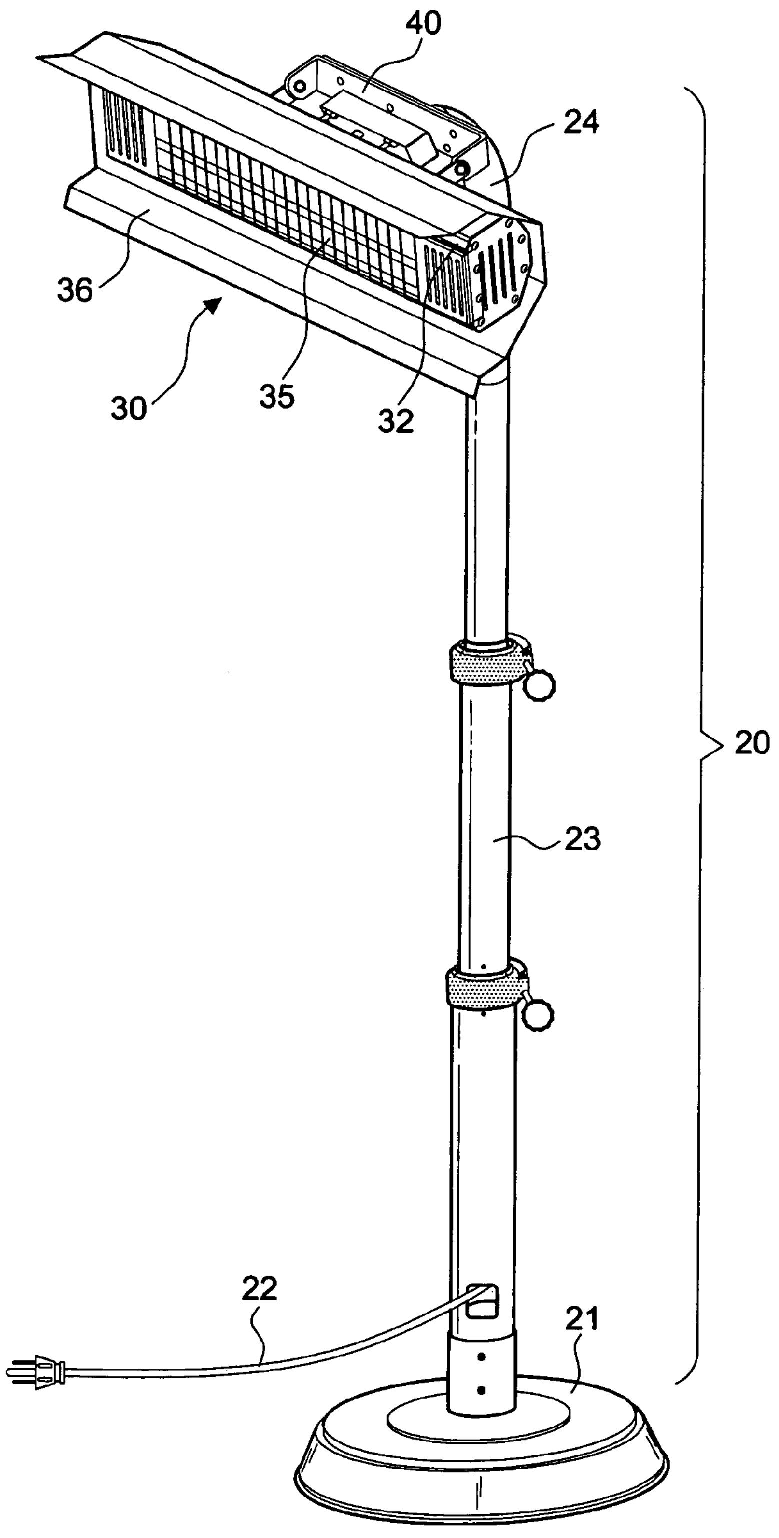
FIG. 4 is a perspective view of a preferred embodiment of the invention.

Referring to FIG. 4, an infrared heater of the present invention comprises:

a support body 20, having a base 21 and a pipe body 23, and the pipe body 23 may come with a sectional contractible design, but not limited to such design, and the pipe body 23 further has a power cable 22 and a connecting base 24 at the top of the pipe body 23; and a heat source irradiating device 30, coupled to the connecting base 24 through a positioning base 40 at the back of the heat source irradiating device 30 and electrically coupled to the power cable 22 for supplying the required electric power.

Figure 5:
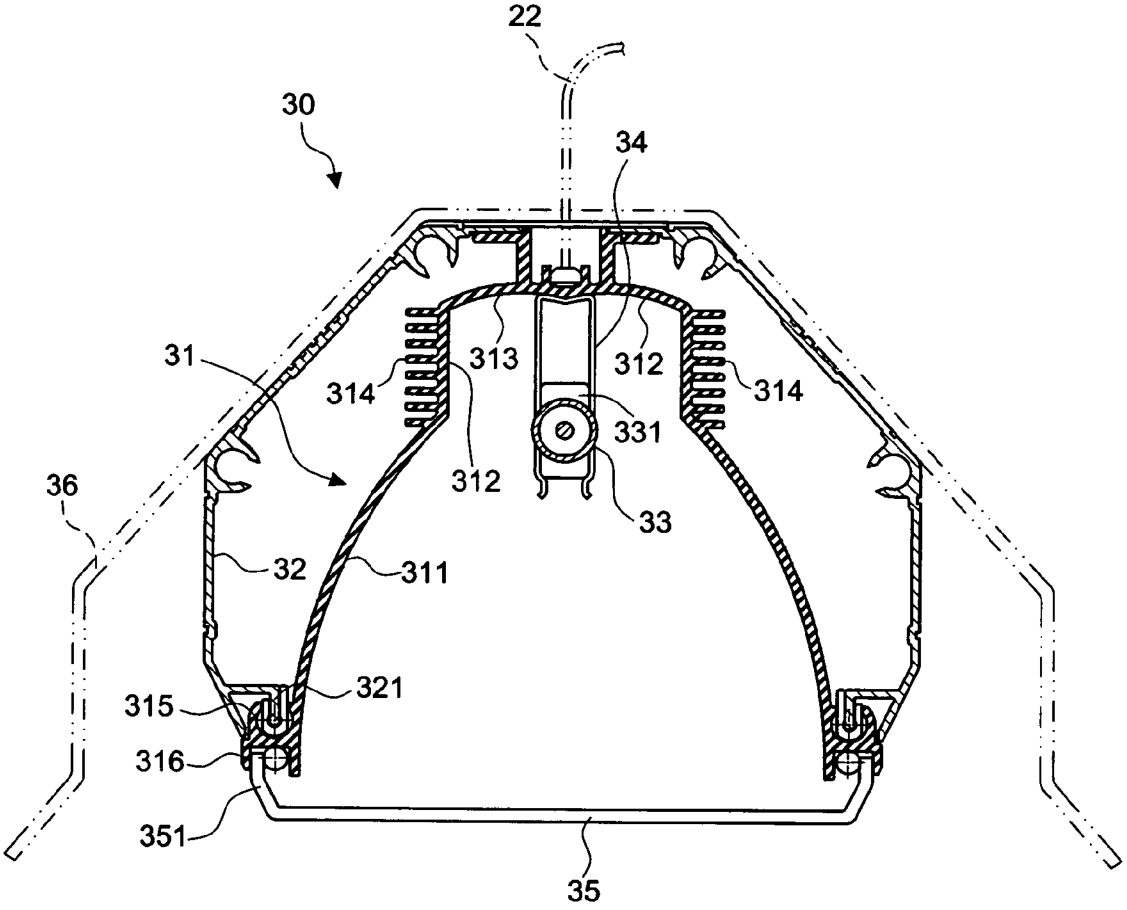
FIG. 5 is a cross-sectional view of a heat source irradiating device of the invention.

The main characteristic of present invention resides on the structure of the heat source irradiating device 30. Referring to FIGS. 4 to 6, the heat source irradiating device 30 comprises:

a reflecting hood 31, integrally formed by aluminum extrusion, and having a hood body 311 in a symmetric arc shape disposed on both sides, an n-shape body 312 formed at the top of the hood body 311, and two non-planar symmetric arc bodies 313 formed at the top surface of the n-shape body 312 and along a center line AA' of the reflecting hood as a base, such that the top surface of the n-shape body 31 form a double-arc wavy " " surface, and each arc body 313 separately defines a circle N1, N2, and both sides of the n-shape body 312 could be parallel or in a "⌒"shape;

a casing 32, for installing and fixing the reflecting hood 31 therein; and an infrared tube 33, installed along the center line AA' of the reflecting hood 31 and at a height between the n-shape body 312 and the hood body 311, such that the center S of the infrared tube 33 is situated between the two centers N1, N2 of the symmetric arc bodies 313 and preferably at the same height or slightly higher than the same level $\overline{N1N2}$ of the two centers, and a radiant heat at the upper half of the infrared tube 33 can be radiated from an open end with an included angle from 60° to 80° from the hood body 311 after the radiant heat is reflected from the two arc bodies 313.

Referring to FIG. 5, the n-shape body 312 of the reflecting hood 31 includes a plurality of heat dissipating fins 314 disposed on both sides of the n-shape body 312, and the heat dissipating fins 314 are integrally formed with the reflecting hood 31 by aluminum extrusion. Besides providing a better mechanical strength, such arrangement also disperses the heat from the reflecting hood 31 to the outside to assure the using life of the infrared heater. Of course, the heat dissipating fins 314 not only can be designed on both sides of the n-shape body 312, but they also can be designed on both sides of the hood body 311 as well.

Further, the hood body 311 of the reflecting hood 31 includes a first embedding groove 315 disposed upward and a second embedding groove 316 disposed downward on both sides of the hood body 311 for embedding and positioning the flange plate 321 disposed on both sides of the casing 32 respectively and embedding and positioning a protruding portion 351 disposed on both sides of a grille 35. However, this structure is not limited to such design, but also can be altered as needed. In addition, the casing 32 can have a cover plate 36 as needed. The electrode end 331 on both sides of the infrared tube 33 can be secured by clamping and electrically coupled to an elastic clip 34 disposed on both sides of the reflecting hood 31, so that the power cable 22 can supply electric power to the infrared tube 33.

Figure 6A:
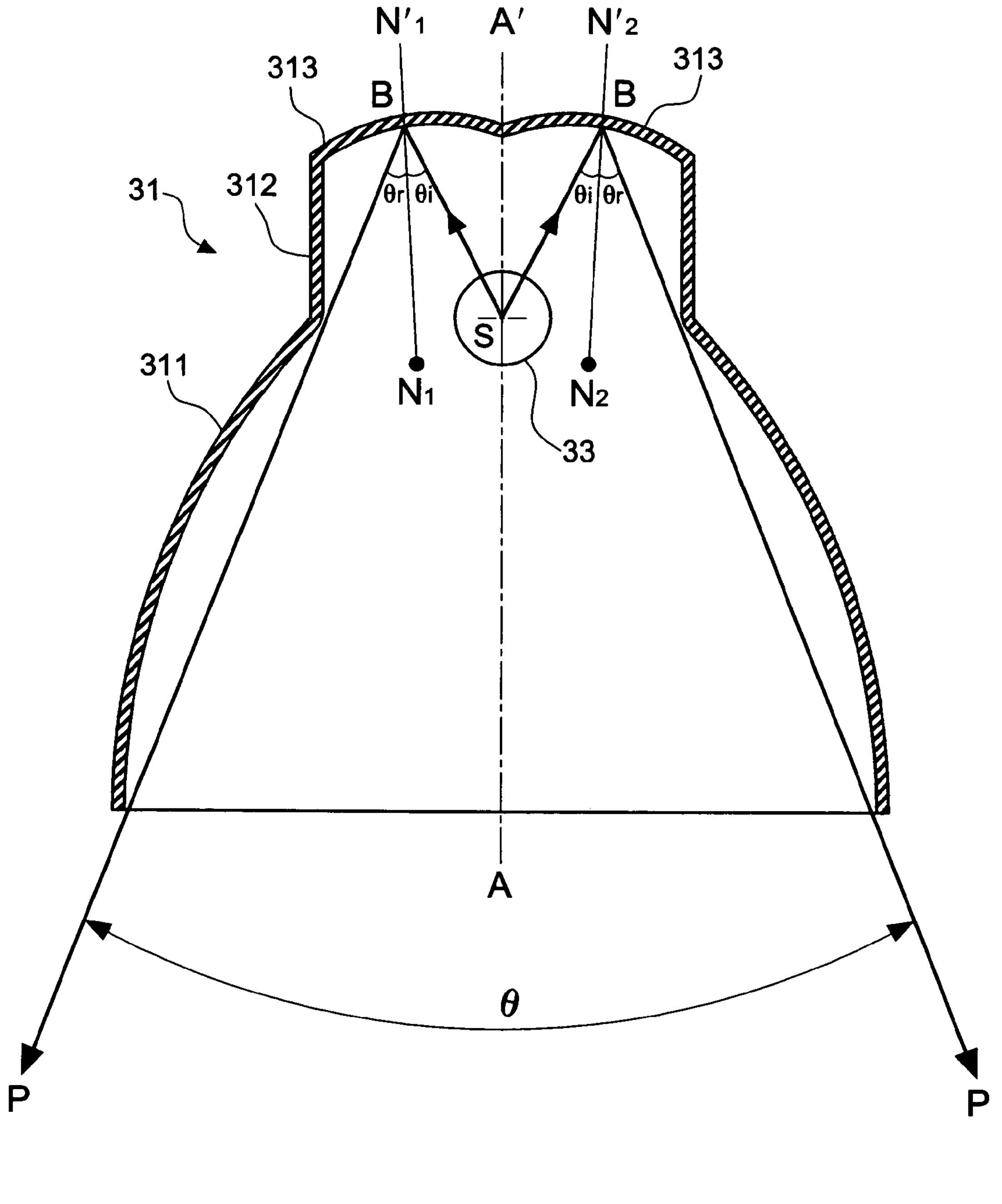
FIGS. 6A and 6B are schematic views of a reflecting hood of the invention.
Figure 6B:
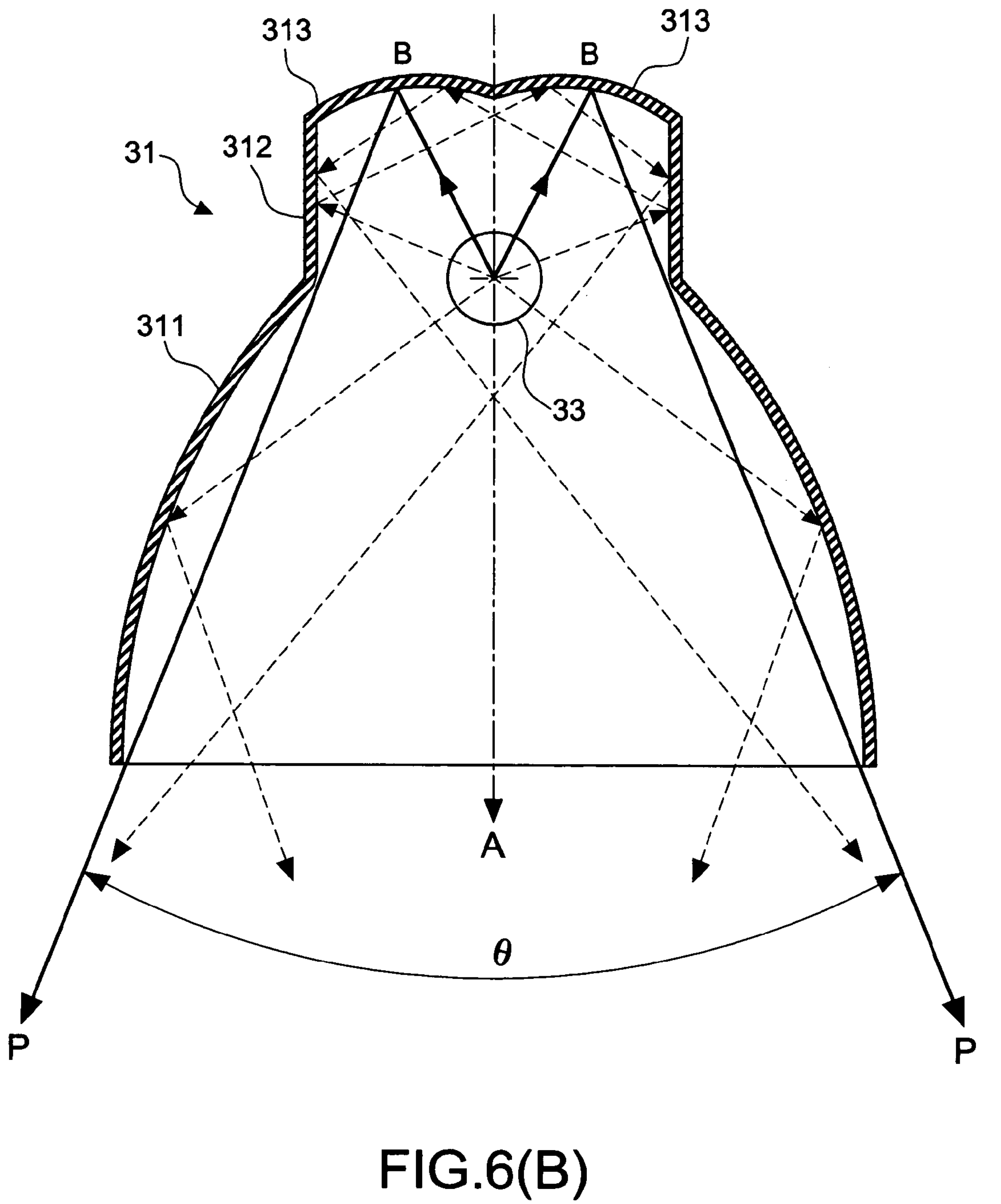

With the foregoing technical measures as shown in FIGS. 6A, 6B, an incident light $\overrightarrow{SB}$, a reflective light $\overrightarrow{BP}$ and a normal $\overline{N_1N_1'}$, $\overline{N_2N_2'}$ of the radiant heat radiating upward at the infrared tube 33 as shown in FIG. 6A are on the incident surface $\overrightarrow{SBP}$ and on both sides of the normal according to the Fermat's principle, since two symmetrical arc bodies 313 are at the top of the n-shape body 312. Further, the angle of incidence θi is equal to the angle of reflection θr. Therefore, the two symmetric arc bodies 313 can reflect the upward radiant heat at the infrared tube 33 without being reflected directly to the infrared tube 33, and the radiant heat is radiated from an open end having an included angle θ from 60° to 80° with the hood body 311, and so on. The radiant heat on both left and right sides of the upper section of the infrared tube 33 and the radiant heat at the lower section of the infrared tube 33 can be radiated directly along the direction $\overrightarrow{SA}$, and the rest of the radiant heat is radiated along the incident path and reflecting path as shown in FIG. 6B. Therefore, the radiant heat on each side of the infrared tube will be distributed evenly in the included angle θ from 60° to 80° after the reflection.

Figure 7:
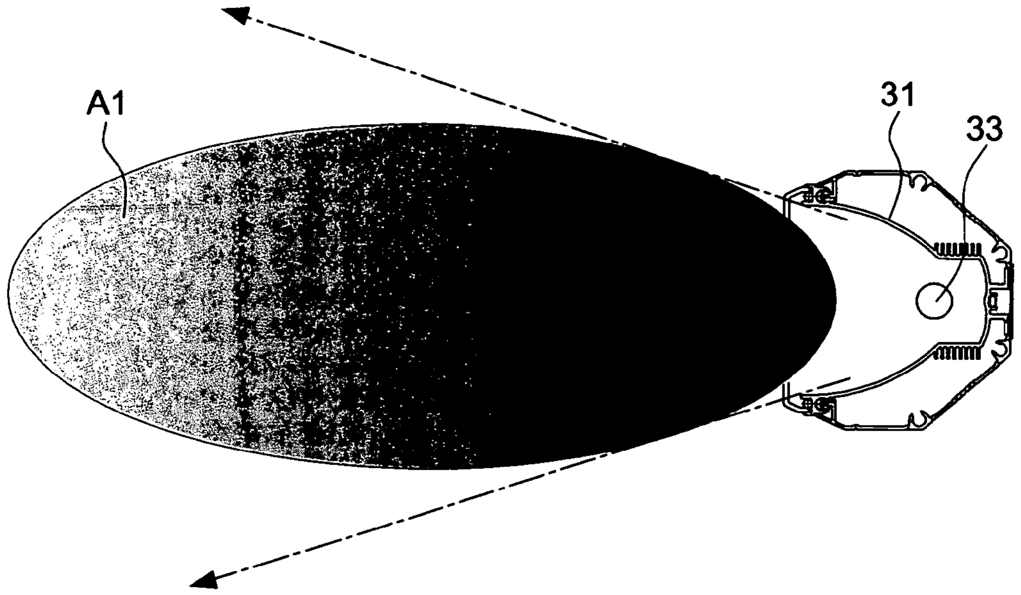
FIG. 7 is a schematic view of a radiant heat temperature area at the time of using an infrared heater of the invention.
Figure 8:
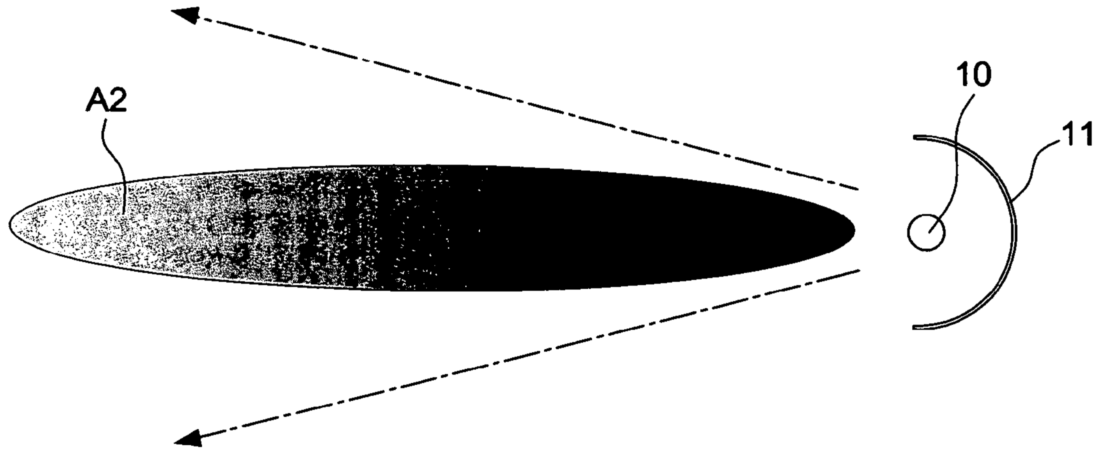
FIG.8 PRIOR ART
FIG. 8 is a schematic view of a radiant heat temperature area at the time of using a prior art electric appliance.
Figure 9:
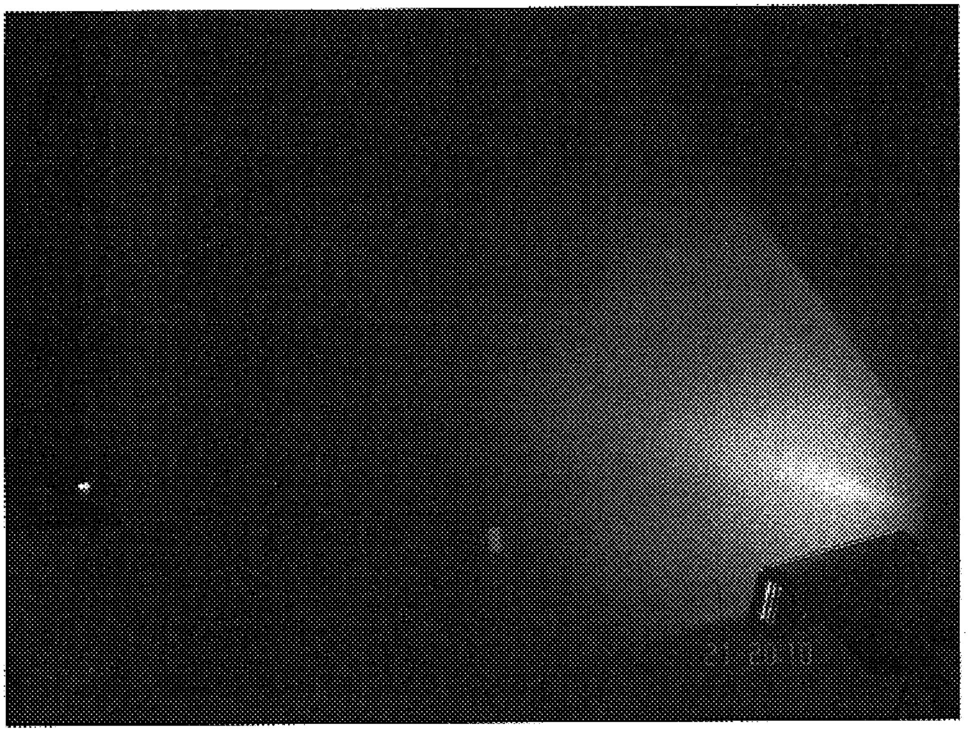
FIG. 9 shows a photo of the application of an infrared heat of the invention.
Figure 10:
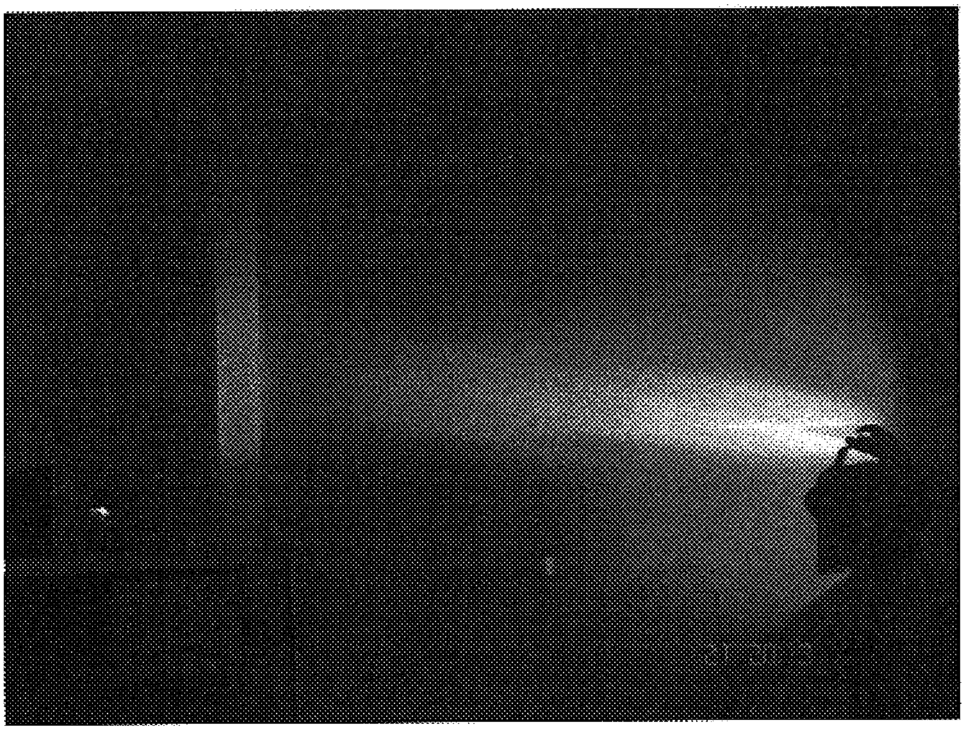
FIG.10 PRIOR ART
FIG. 10 shows a photo of the application of a prior art electric appliance.

The radiant heat temperature area A1 of the invention as shown in FIG. 7 is broader and evener than the radiant heat temperature area A2 of the prior art reflecting hood 11 as shown in FIG. 8. The radiant heat temperature areas A1, A2 as shown in FIGS. 7 and 8 are produced according to the photos of the experiments as shown in FIGS. 9 and 10. FIG. 9 shows the radiant heat temperature area when the infrared heater of the present invention is used, and the irradiating angle is wider, and the heat distribution is evener. FIG. 10 shows the radiant heat temperature area when the prior art infrared heater is used. In the comparison of FIGS. 7 to 10, the present invention uses a special reflecting hood 31 to avoid the heat source from reflecting to the infrared tube 33, so as to improve the heat reflectivity and extend the life expectancy of the infrared tube and form the best angle of incident at the incident surface $\overrightarrow{SBP}$. The present invention further expands the irradiating range, so that the heat energy is distributed evener instead of being concentrated at a specific area, and the present invention definitely can improve over the prior art infrared heaters.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. An infrared heater, comprising:

a) a support body having a base and a pipe body, the pipe body having a power cable passing through the pipe body and a connecting base disposed at the top of the pipe body; and b) a heat source irradiating device coupled onto the connecting base by a positioning base disposed at the back of the heat source irradiating device and electrically coupled to the power cable, the heat source irradiating device including:

i) a reflecting hood integrally formed by aluminum extrusion, and having a hood body with symmetric arcs on both sides, an n-shape body formed at the top of the hood body, and two non-planar symmetric arc bodies with a center line AA' of the reflecting hood as a base and disposed on the top surface of the n-shape body, such that the n-shape body shows a double-arc wavy surface, and the each arc body separately defines each center N1, N2;

ii) a casing for installing and fixing the reflecting hood therein; and iii) an infrared tube installed along a center line AA' of the reflecting hood, and disposed at a height between the n-shape body and the hood body, such that the center S of the infrared tube is situated between two centers N1, N2 of the two symmetrical arc bodies, and a radiant heat is radiated from an open end having an included angle from 60° to 80° with the hood body after the radiant heat at the upper half of the infrared tube is reflected from the two arc bodies.

2. The infrared heater as recited in claim 1, wherein the n-shape body of the reflecting hood includes a plurality of heat dissipating fins disposed on both sides of the n-shape body.

3. The infrared heater as recited in claim 1, wherein the hood body of the reflecting hood includes a first embedding groove disposed upward on both sides of the hood body for embedding and positioning the flange plate on both sides of the casing.

4. The infrared heater as recited in claim 1, wherein the hood body of the reflecting hood includes a second embedding groove disposed downward on both sides of the hood body for embedding and position the protruding portion on both sides of a grille.

5. The infrared heater as recited in claim 1, wherein the casing further comprises a cover plate.

6. The infrared heater as recited in claim 1, further comprising an electrode end disposed on both sides of the infrared tube and clamped and positioned and electrically coupled to an elastic clamp secured on both sides of the reflecting hood.

* * * * *